(12) United States Patent
McNulty

(10) Patent No.: US 11,203,534 B2
(45) Date of Patent: *Dec. 21, 2021

(54) METHOD, SYSTEM AND APPARATUS FOR TREATMENT OF FLUIDS

(71) Applicant: Typhon Treatment Systems Limited, London (GB)

(72) Inventor: Peter D. McNulty, Los Angeles, CA (US)

(73) Assignee: TYPHON TREATMENT SYSTEMS LIMITED, London (GB)

(*) Notice: Subject to any disclaimer, the term of this patent is extended or adjusted under 35 U.S.C. 154(b) by 18 days.

This patent is subject to a terminal disclaimer.

(21) Appl. No.: 16/795,241

(22) Filed: Feb. 19, 2020

(65) Prior Publication Data

US 2020/0247689 A1 Aug. 6, 2020

Related U.S. Application Data

(63) Continuation of application No. 15/329,543, filed as application No. PCT/GB2015/050627 on Mar. 4, 2015, now Pat. No. 10,604,423.

(Continued)

(51) Int. Cl.
*C02F 1/32* (2006.01)
*C02F 1/72* (2006.01)
(Continued)

(52) U.S. Cl.
CPC .............. *C02F 1/325* (2013.01); *C02F 1/722* (2013.01); *C02F 1/76* (2013.01); *C02F 1/78* (2013.01);
(Continued)

(58) Field of Classification Search
CPC .............. C02F 1/325; C02F 2201/3222; C02F 2201/3228
See application file for complete search history.

(56) References Cited

U.S. PATENT DOCUMENTS 5,635,133 A 6/1997 Glazman
2002/0144955 A1 10/2002 Barak et al.
(Continued)

FOREIGN PATENT DOCUMENTS

CN 102989030 A 3/2013
DE 10 2010 005893 A1 7/2011
(Continued)

OTHER PUBLICATIONS

Patent Cooperation Treaty (PCT) International Search Report regarding PCT/GB2015/050627 dated Nov. 2, 2015; 10 pages.
(Continued)

*Primary Examiner* — Bradley R Spies
(74) *Attorney, Agent, or Firm* — Cislo & Thomas, LLP

(57) ABSTRACT

This invention is directed to a method, system and apparatus for the treatment fluids. An apparatus for the treatment of a fluid comprises a fluid chamber and at least one ultraviolet light unit arranged at a periphery of the fluid chamber. The at least one ultraviolet light unit comprises at least one ultraviolet light emitting diode and an ultraviolet light directing element. The ultraviolet light directing element is configured to collimate at least a portion of the light emitted from the at least one ultraviolet light emitting diode in use such that the ultraviolet light rays emitted from each ultraviolet light unit are parallel in a first plane. Also described is a method for the cooling a light emitting diode in a fluid treatment system.

28 Claims, 14 Drawing Sheets

Related U.S. Application Data

(60) Provisional application No. 62/029,982, filed on Jul. 28, 2014.

(51) Int. Cl.
*C02F 1/76* (2006.01)
*C02F 1/78* (2006.01)

(52) U.S. Cl.
CPC .. *C02F 2201/003* (2013.01); *C02F 2201/326* (2013.01); *C02F 2201/328* (2013.01); *C02F 2201/3222* (2013.01); *C02F 2201/3227* (2013.01); *C02F 2201/3228* (2013.01); *C02F 2209/02* (2013.01); *C02F 2209/11* (2013.01); *C02F 2301/024* (2013.01); *C02F 2301/026* (2013.01); *C02F 2303/04* (2013.01)

(56) References Cited

U.S. PATENT DOCUMENTS

| | | | |
|---|---|---|---|
| 2003/0170151 A1 | 9/2003 | Hunter et al. | |
| 2005/0056597 A1 | 3/2005 | Fries et al. | |
| 2009/0208386 A1 | 8/2009 | Barsky et al. | |
| 2010/0237254 A1* | 9/2010 | Mason | A61L 9/20 250/435 |
| 2010/0291502 A1 | 11/2010 | Knight | |
| 2012/0051977 A1 | 3/2012 | Boodaghians | |
| 2012/0228236 A1 | 9/2012 | Hawkins, II | |
| 2013/0048545 A1 | 2/2013 | Shatalov et al. | |
| 2013/0146783 A1 | 6/2013 | Boodaghians et al. | |
| 2014/0202962 A1 | 7/2014 | Bilenko et al. | |
| 2015/0060692 A1* | 3/2015 | Chen | C02F 1/325 250/435 |
| 2015/0114912 A1* | 4/2015 | Taghipour | C02F 1/325 210/748.11 |
| 2015/0284266 A1 | 10/2015 | Matsui | |

FOREIGN PATENT DOCUMENTS

| | | |
|---|---|---|
| DE | 10 2010 047318 A1 | 4/2012 |
| EP | 2 567 713 A1 | 3/2013 |
| JP | 2011 016074 A | 1/2011 |
| JP | 2012115715 A | 6/2012 |
| JP | 2013056159 A | 3/2013 |
| KR | 2011 0116400 A | 10/2011 |
| KR | 2013 0017998 A | 2/2013 |
| RU | 2183197 C1 | 6/2002 |
| WO | 2008/144922 A1 | 12/2008 |
| WO | 2011057015 A2 | 5/2011 |
| WO | 2013/084154 A1 | 5/2013 |
| WO | 2013/175931 A1 | 11/2013 |
| WO | 2013176736 A1 | 11/2013 |
| WO | 2014068913 A1 | 5/2014 |

OTHER PUBLICATIONS

UK Intellectual Property Office Combined Search and Examination Report regarding Application No. GB1820896.7 dated Jan. 31, 2019; 7 pages.
UK Intellectual Property Office Combined Search and Examination Report regarding Application No. GB1503676.7 dated Sep. 7, 2015; 9 pages.
UK Intellectual Property Office Combined Search and Examination Report regarding Application No. GB1820888.4 dated Jan. 31, 2019; 7 pages.
UK Intellectual Property Office Combined Search and Examination Report regarding Application No. GB1503676.7 dated Dec. 21, 2018; 5 pages.
UK Intellectual Property Office Combined Search and Examination Report regarding Application No. GB1820882.7 dated Jan. 31, 2019; 9 pages.
Russian Search Report dated Oct. 10, 2018; 3 pages.
Japanese Notice of Reasons for Rejection regarding Application No. JP 2017-526023 dated Nov. 2, 2018; 4 pages.
Taiwanese Official Letter and Search Report regarding Application No. 104106989 dated Sep. 28, 2018; 5 pages.

* cited by examiner

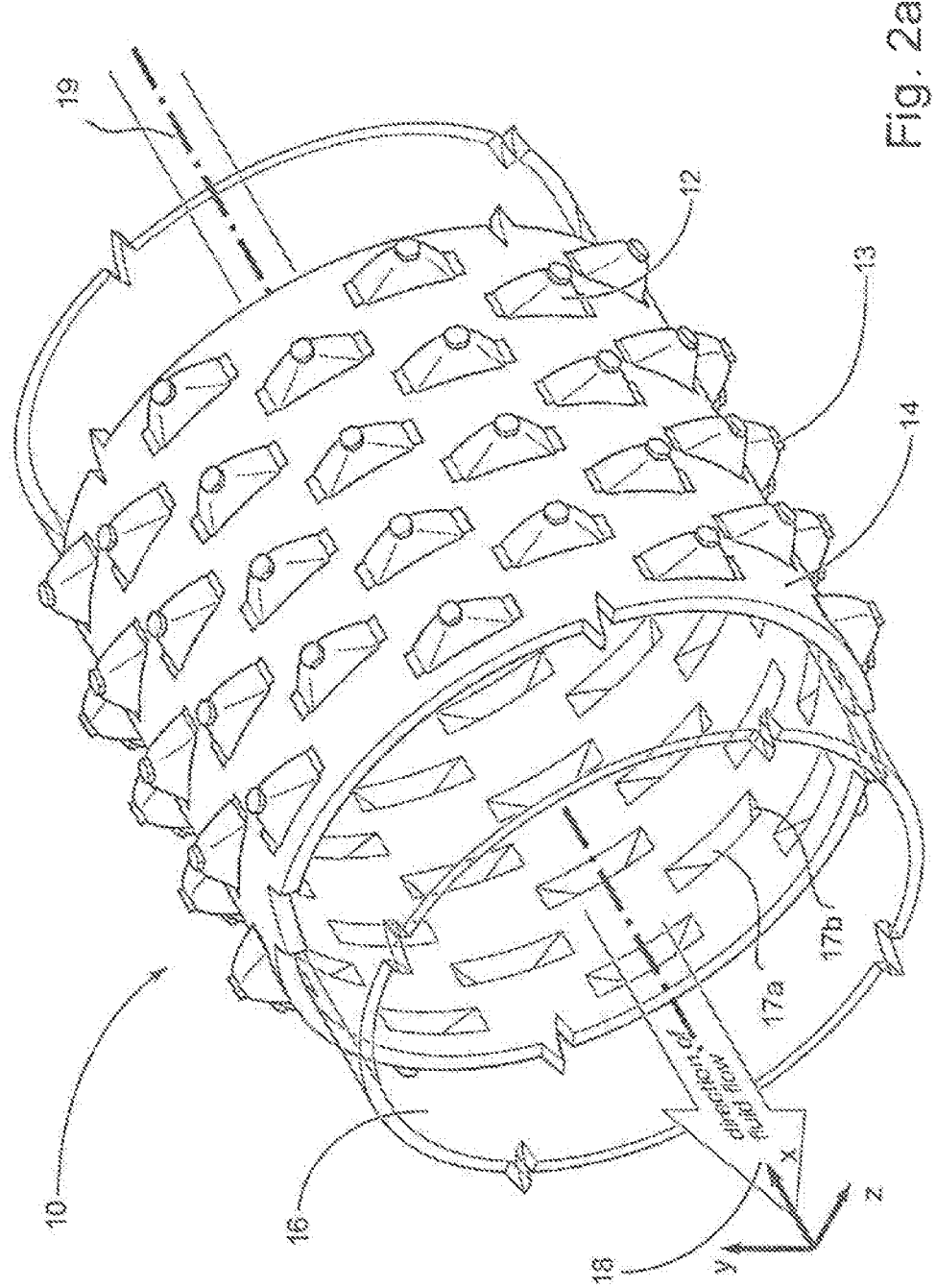

METHOD, SYSTEM AND APPARATUS FOR TREATMENT OF FLUIDS

CROSS-REFERENCES TO RELATED APPLICATION

This application claims the benefit of U.S. application Ser. No. 15/329,543, filed Jan. 26, 2017, entitled "Method, System and Apparatus for Treatment of Fluids, which is a national stage filing of PCT Application PCT/GB2015/050627, filed Mar. 4, 2015, and the benefit of U.S. Provisional Application Ser. No. 62/029,982, filed Jul. 28, 2014, all of which are incorporated here by this reference.

The present invention is concerned with using ultraviolet (UV) light for treatment of transparent or translucent liquid, vaporous, or gaseous fluids for the purpose of reducing and preferably minimizing risk of exposure of toxic chemicals and/or biological pathogens to humans, animals, and the natural environment. In particular the present invention is suitable for, but not limited to, drinking water treatment, wastewater treatment, and treatment of industrial process water, for example for water used in semiconductor chip manufacture.

The current state of the art of UV fluid treatment employs mercury gas-filled tube lamps installed in a chamber through which fluid is passed. The number of lamps per chamber can range from one to over 200. For single lamp chambers the tube is commonly oriented parallel to the fluid flow. For multi-lamp applications the lamps and/or chamber are typically oriented perpendicular to fluid flow. Chambers can be installed in parallel to treat high fluid flow rates. The amount of energy required to employ the mercury gas-filled tube lamps is high and costly. Also, such lamps are not long lasting and need to be replaced often.

The state of the art fluid treatment systems require an electric current passed through the lamp that causes the mercury vapor to emit light in the UV range, peaking at 254 nanometers. Approximately fifteen percent of the electrical energy converts to photons. Over 85 percent of the electrical energy is converted to heat inside the lamps. Heat is transmitted into the fluid through the tube surface. If the fluid is a liquid, for example water, the heat can create a mineral scaling problem. Several common mineral salts such as sodium sulfate and calcium hydroxide become less soluble in water as temperature increases, exacerbating the problem. The system is not ideal because each lamp must be cleaned frequently to maintain the intensity of UV emitted.

The UV light radiates from the lamps into the fluid passing by. A percentage of the photons emitted by lamps close to the wall of the chamber is absorbed by the material at the wall surface. Fluids that are less than 100 percent transparent absorb a percentage of photons emitted from the lamps. Transmittance is always below 100% and even tap water can have transmittance as low as 90%. UV light passing through a 30 cm-wide column of water with 85% transmittance will lose 95% of its intensity, as dictated by Beer's Law. It is not uncommon for treatment fluids to absorb 25 percent of the emitted energy at a distance of one centimeter from the lamp. In translucent fluids the probability of a photon striking a location where it is absorbed by an organism's DNA nucleotide is a function of the distance traveled by the photon in the treatment chamber (the photon path length). In addition, the intensity of light diverging from a source decays according to the Inverse Square Law.

A small fraction (on the order of $10^{-6}$) of photons reaching target organisms in the fluid being treated result in damage to the organism's DNA. Such damage inactivates the organism's viability or reproductive function. UV light disinfection effectiveness decreases as turbidity increases, a result of the absorption, scattering, and shadowing caused by the suspended solids and dissolved compounds. The germicidal dose of UV listed in the 2006 US Environmental Protection Agency UV Disinfection Guidance Manual is 40 mJ/cm$^2$. An effective system for the treatment of fluids such as waste water should therefore provide this dose of UV across the whole treatment area. It is to be understood that the effective germicidal dose for some organisms (or required dose for particular chemical treatments) may vary significantly from the 40 mJ/cm$^2$ dose.

There is a need in the art for a fluid treatment system for public or private use that efficiently and effectively treats and preferably sterilizes UV translucent fluids, is durable, reliable, energy efficient, and requires less maintenance than existing systems. Similarly, there is a need in the art for an energy efficient photochemical treatment.

The present invention provides an apparatus for the treatment of a fluid comprising a fluid chamber and at least one ultraviolet light unit arranged at a periphery of the fluid chamber, wherein the at least one ultraviolet light unit comprises at least one ultraviolet light emitting diode and an ultraviolet light directing element, wherein the ultraviolet light directing element is configured to collimate at least a portion of the light emitted from the at least one ultraviolet light emitting diode in use such that the ultraviolet light rays emitted from each ultraviolet light unit are parallel in a first direction and are not parallel in a second direction, and wherein the second direction is perpendicular to the first direction.

By collimating light in one direction, the photon path length of the light is reduced, thereby reducing energy losses relating to the Inverse Square Law and Beer's law.

Preferably, the ultraviolet light directing element is configured to converge the collimated ultraviolet light in the second direction. More preferably, the ultraviolet light directing element is configured to converge the collimated ultraviolet light to focus at or near a central axis of the fluid chamber.

Alternatively, the ultraviolet light directing element is configured to scatter the collimated light in the second direction.

Preferably, the apparatus comprises a plurality of ultraviolet light units. Preferably, the plurality of ultraviolet light units are arranged radially around the circumference or periphery of the fluid chamber. Preferably, the plurality of ultraviolet light units are arranged in one or more rings around the periphery of the fluid chamber. Preferably, adjacent rings of ultraviolet light units are offset from each other by an amount required to assure even exposure to UV light of all of the fluid to be treated in use.

Preferably, the fluid chamber is transparent.

Preferably, the at least one ultraviolet light unit is arranged on the exterior of the fluid chamber.

The arrangement of the UV LEDs on the outside of the fluid chamber improves ease of access for cleaning, maintenance and replacement.

Preferably, the apparatus comprises a cover arranged on the exterior of the fluid chamber, wherein the at least one ultraviolet light unit is mounted into the cover. Preferably, the cover is formed from a material which blocks ultraviolet light and comprises at least one aperture arranged to allow ultraviolet light emitted by the ultraviolet light emitting diode into the fluid chamber in use.

Preferably, the light directing element is a reflector. Most preferably, each of the at least one light emitting diodes is located at a focal point of the reflector. Preferably a central axis of the fluid chamber is located at or near a focal point of the reflector.

In a further embodiment the present invention provides an apparatus for the treatment of a fluid comprising a fluid chamber and at least one ultraviolet light unit arranged at a periphery of the fluid chamber; wherein the at least one ultraviolet light unit comprises at least one ultraviolet light emitting diode and an ultraviolet light directing element; and wherein the ultraviolet light directing element is configured to collimate at least a portion of the light emitted from the at least one ultraviolet light emitting diode in use such that the ultraviolet light rays emitted from each ultraviolet light unit are parallel only in a single direction Preferably, the apparatus comprises one or more elements for inducing rotational or vortical motion in the fluid to be treated.

Preferably, the apparatus comprises a cooling apparatus for controlling the temperature of the ultraviolet light emitting diode. Preferably, the cooling apparatus is configured to controllably transfer heat from the ultraviolet light emitting diode to the fluid being treated in use.

Preferably the cooling apparatus comprises a coolant circuit; wherein a first part of the coolant circuit is arranged in contact with the ultraviolet light emitting diode for transfer of heat between the coolant circuit and the ultraviolet light emitting diode in use; and wherein a second part of the coolant circuit comprises a heat exchanger for transfer of heat between the coolant circuit and the fluid being treated in use. Preferably, the apparatus further comprises a control element configured to change a light output of the apparatus in response to a change in the temperature of the coolant in use. Preferably, the apparatus further comprises a control element configured to change a light output of the apparatus in response to a change in the transmissivity of the fluid to be treated in use. Preferably, the apparatus further comprises a plurality of ultraviolet light units, wherein the control element is configured to increase the number of ultraviolet light units emitting light in response to an increase in the temperature of the coolant.

In a further embodiment the present invention provides an apparatus for the treatment of a fluid comprising; an array of ultraviolet light emitting diodes oriented radially around the outside surface of a transparent pipe within which the fluid to be treated is contained; wherein each ultraviolet light emitting diode is mounted at a focal point of a reflector; and wherein the reflector collimates reflected light in the direction of a longitudinal axis of the pipe and concentrates reflected rays through a cross section of the pipe in use.

In a further embodiment the present invention provides an apparatus for the treatment of a fluid comprising; an array of ultraviolet light emitting diodes oriented radially around the outside surface of a transparent pipe within which the fluid to be treated is contained; wherein each ultraviolet light emitting diode is mounted at a focal point of a reflector; and wherein the reflector collimates reflected light in the direction of a longitudinal axis of the pipe and scatters reflected rays through a cross section of the pipe in use.

In a further embodiment the present invention provides an apparatus for the treatment of a fluid comprising; an array of ultraviolet light emitting diodes oriented radially around the outside surface of a transparent pipe within which the fluid to be treated is contained; wherein ultraviolet light from each light emitting diode is passed through a lens; and wherein the lens collimates light in the direction of the longitudinal axis, and concentrates light in a cross section of the pipe in use.

In a further embodiment the present invention provides an apparatus for the treatment of a fluid comprising; an array of ultraviolet light emitting diodes oriented radially around the outside surface of a transparent pipe within which the fluid to be treated is contained; and a cooling system for cooling the array of ultraviolet light emitting diodes; wherein the cooling system is configured to circulate a cooling liquid such that heat is exchanged i) between the ultraviolet light emitting diodes and the cooling liquid and ii) between the cooling liquid and the fluid to be treated.

Preferably, the cooling liquid is a glycol mixture.

In a further embodiment the present invention provides an apparatus for the treatment of a fluid comprising an array of ultraviolet light emitting diodes oriented radially around the outside surface of a transparent pipe within which the fluid to be treated is contained; and a cooling system for cooling the array of ultraviolet light emitting diodes; wherein the cooling system comprises one or more temperature sensors for monitoring the temperature of the cooling liquid; and wherein the cooling system is configured to turn ultraviolet light emitting diodes on in response to an increase in temperature of the cooling liquid and to turn ultraviolet light emitting diodes off in response to a decrease in temperature of the cooling liquid.

In a further embodiment the present invention provides an apparatus for the treatment of a fluid comprising; an array of ultraviolet light emitting diodes oriented radially around the outside surface of a transparent pipe within which the fluid to be treated is contained; one or more ultraviolet transmittance sensors; and treatment monitoring software configured to turn ultraviolet light emitting diodes off in response to an increase in transmissivity of the fluid to be treated and to turn ultraviolet light emitting diodes off in response to a decrease in transmissivity of the fluid to be treated.

In a further embodiment the present invention provides the use of the apparatus as claimed in any preceding claim to treat a fluid.

In a further embodiment the present invention provides a system for the treatment of a fluid comprising a plurality of apparatuses as described above.

In a further embodiment the present invention provides a method for the treatment of a fluid comprising the steps of:
 introducing the fluid into a fluid chamber;
 directing light emitted from an ultraviolet light emitting diode into the fluid;
 wherein at least a portion of the ultraviolet light emitted from the at least one ultraviolet light emitting diode is collimated such that the ultraviolet light rays emitted from each ultraviolet light unit are parallel only in a single direction.

In a further embodiment the present invention provides an apparatus for cooling a light emitting diode in a fluid treatment system, said apparatus being configured to controllably transfer heat from the light emitting diode to the fluid being treated in use. Preferably, the apparatus comprises a coolant circuit; and wherein a first part of the coolant circuit is arranged in contact with the light emitting diode for transfer of heat between the coolant circuit and the light emitting diode in use; and wherein a second part of the coolant circuit comprises a heat exchanger for transfer of heat between the coolant circuit and the fluid being treated in use. Preferably, the apparatus comprises a control element configured to change a light output of the light emitting diode in response to a change in the temperature of the coolant or the transmissivity of the fluid to be treated in use.

In a further embodiment the present invention provides a method for the cooling a light emitting diode in a fluid treatment system comprising the steps of:

indirectly transferring heat from the light emitting diode to the fluid being treated in the system in use.

Preferably the indirect heat transfer is carried out by means of a coolant circuit.

Preferably the step of controlling a light output of the light emitting diode in response to a change in the temperature of the coolant or the transmissivity of the fluid to be treated in use.

By providing an array of ultraviolet light units in accordance with the present invention collimating the light such that the rays are parallel in a first direction and scattered the light perpendicular to first direction, the apparatus benefits from a reduced photon path length in the first direction, while the scattering allows for the light to be emitted over a broader angle than would be the case if collimated in both directions, allowing for fewer light emitting units to be provided around the circumference of the fluid chamber while providing an optimized dosage across the treatment area.

By collimating the light such that the rays are parallel in a first direction perpendicular to a central axis of the fluid chamber and converging the light in a second direction perpendicular to the direction in which the rays are parallel, the intensity of the light increases with distance from the source. This improves efficiency and ensures that the germicidal dose of UV is delivered across a sufficient portion of the cross section of the fluid chamber.

An interior surface of the apparatus of the present invention comprises a transparent pipe that will not get hot during operation, so there is significantly less mineral scaling than with mercury lamps. The total quartz surface area of a large number of submerged cylindrical mercury lamps in contact with the water being treated in prior art systems is significantly higher than the surface area of a pipe in an equivalent water treatment device of the present invention. Since the total surface area of quartz in contact with the treatment fluid in the present invention is significantly lower, the interior surface is easily cleaned.

In addition, since all operating components of the system are on the exterior of the pipe, maintenance can be performed without shutting down the treatment system and draining the treatment flow cell.

The light output of an LED is inversely proportional to its operating temperature. Consequently, hot LEDs emit less light than cool LEDs. There is therefore a need to cool LEDs during operation in order to maintain light output.

DESCRIPTION OF THE DRAWINGS

Preferred embodiments of the present invention will now be described by way of example only with reference to the accompanying drawings, in which:

FIG. 2a is a schematic perspective view of a section of a single treatment cell assembly in accordance with the present invention;

FIG. 2b is a schematic perspective view of a single reflector subassembly of the treatment cell of FIG. 2a;

The present invention provides a method, system and apparatus for treating fluids using one or more UV light emitting diodes (LEDs). The system of the invention comprises one or more apparatuses for treating fluids which are described in the following specific description, purely by way of an example only and not by way of limitation, as treatment flow cells 10 (the term "cell" as used herein having the same meaning and being interchangeable with the word "chamber").

The apparatus of the invention comprises a fluid chamber which is described and illustrated in the following specific description, purely as an example and not by way of limitation, as a conduit in the form of pipe 16. It is to be understood that the fluid chamber of the present invention may take other forms. The fluid chamber may be a conduit for conducting a flow of fluid to be treated, for example a pipe or a conduit with an opening at either end of the structure. Alternatively, the fluid chamber may be a container for at least temporarily retaining a body of fluid for treatment. The fluid chamber, in whichever of these forms it takes, may be cylindrical or have other shapes; conical, rectangular, octagonal, polygonal or other. In a preferred embodiment, the adopted shape of the fluid chamber and arrangement of LEDs and reflector subassemblies will be such that the fluid is given sufficient exposure to UV light as it flows through or exits the fluid chamber such that a germicidal dose is experienced.

Figure 1:
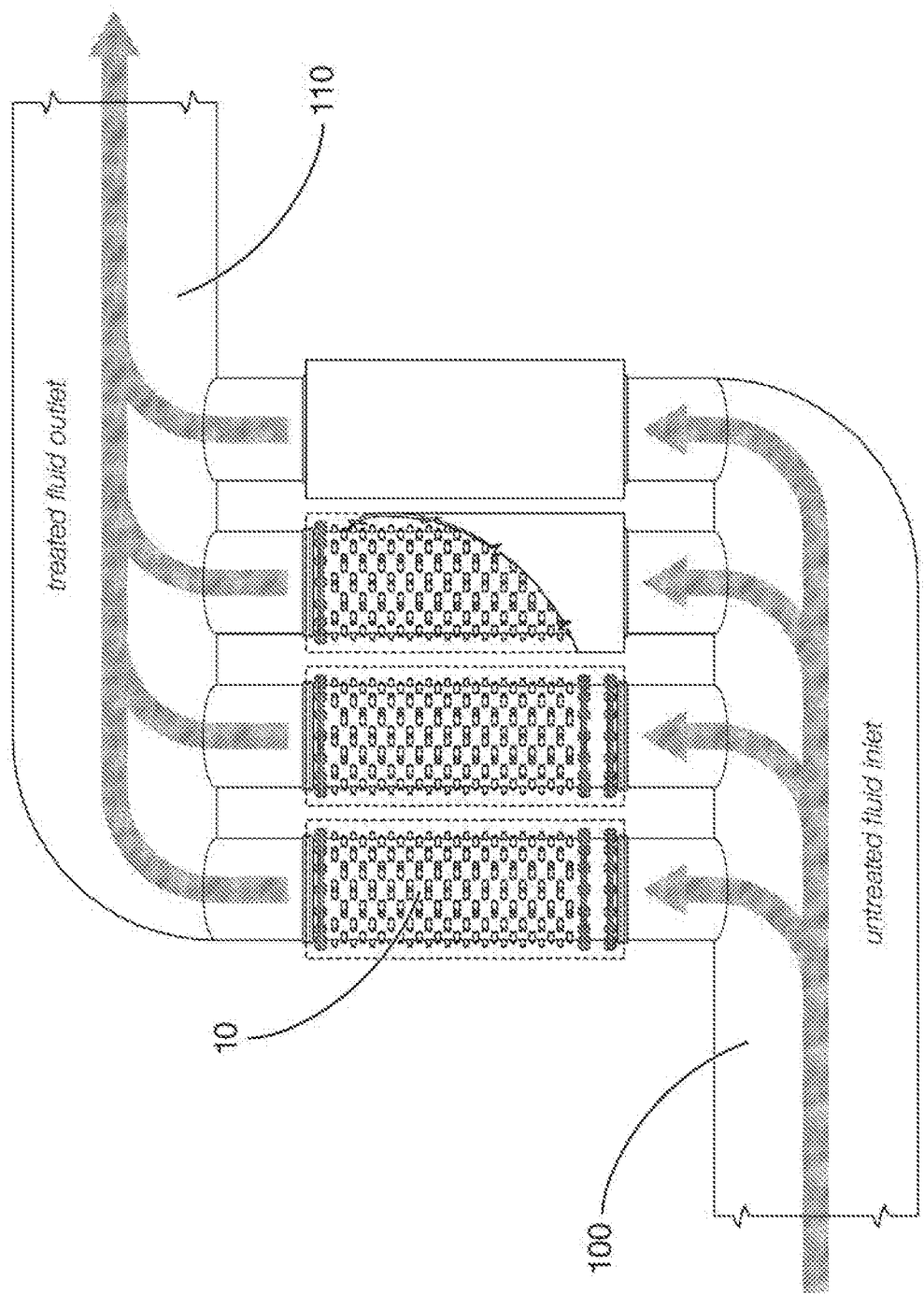
FIG. 1 is a schematic view of a parallel bank of treatment cells for sterilizing fluids using UV light produced by an array of LED lights in accordance with the present disclosure.

In a preferred embodiment, the apparatus of the present invention comprises an array of UV LEDs arranged around the periphery of the fluid chamber. Preferably, the UV LEDs are arranged radially around the circumference of the fluid chamber (as shown in FIGS. 1 and 2a). Preferably, the UV LEDs are distributed evenly around the chamber. Preferably, the fluid chamber is a transparent pipe and the UV LEDs are arranged radially around the outside circumference of the transparent pipe.

FIG. 1 illustrates a system comprising a parallel bank of treatment flow cells 10. In an alternative embodiment, the fluid treatment cells 10 may be non-parallel. The system of the invention may comprise one or more treatment flow cells 10.

As depicted in FIG. 1, the system comprises four apparatus in the form of treatment flow cells 10, in parallel, with consistent diameters. The diameter of each treatment flow cell 10 is smaller than the diameter of the untreated fluid inlet pipe 100 and that of the treated fluid outlet pipe 110.

In another embodiment, it is possible to have one or more treatment flow cells 10 that are not entirely cylindrical or not cylindrical at all, for example, they may be rectangular or any shape or form. In yet another embodiment, the inlet diameter of the treatment flow cells 10 may be smaller or larger than the outlet diameter of the treatment flow cells 10. In a preferred embodiment, any shape of the treatment flow cells 10 in the system will be such that the fluid passing through has all receives the required dose of UV light. This is preferable such that the fluid passes through the treatment flow cells 10 at a rate required to sufficiently treat and preferably to sterilize the fluid, thereby minimizing the survival or viability of biological pathogens in the treatment fluid.

In yet another embodiment, the one or more untreated fluid inlet pipes 100 and the treated fluid outlet pipes 110 could have larger or smaller diameters upstream or downstream in order to customize the system to different applications, e.g., public or private fluid treatment systems, and to be easily applicable to different configurations and designs of existing treatment systems or newly installed systems in unique spaces.

The system of the invention comprises one or more apparatuses for the treatment of a fluid, each apparatus comprising a fluid chamber and at least one ultraviolet light unit arranged at a periphery of the fluid chamber. The at least one ultraviolet light unit comprises at least one ultraviolet light emitting diode and an ultraviolet light directing element. In the illustrated embodiment, each ultraviolet light unit is in the form of an LED and reflector subassembly 12.

FIG. 2a illustrates a treatment flow cell apparatus 10 for sterilizing fluids using UV light produced by an array of LED reflector subassemblies 12 incorporating LEDs 13 mounted radially around the circumference in rings.

The apparatus may comprise a cover which fits around and at least partially covers the fluid chamber. In the illustrated embodiment, the cover is a structural jacket 14. The LEDs are mounted into, interface with or are carried by the structural jacket 14, which that fits around the outside of a transparent pipe 16. Adjacent rings of LED subassemblies 12 may be arranged to stagger/offset the reflector subassemblies from each other by an amount required to assure even exposure to UV of all fluid 18 passing through the fluid chamber (a so-called "precession" arrangement).

The cover may be made up of stainless steel or any other material that blocks UV light, may provide structural support to withstand pressure from the internal fluid 18, and may provide a frame for each reflector subassembly 12. Subassemblies 12 may be fashioned in the cover without any glue, plastic, or other adhesive materials that could melt and or turn to powder from exposure to UV from the LED lights 13. Further, the reflector subassemblies can be friction fit, interference fit, die cast, attached with metal clips or otherwise arranged or mounted.

The fluid chamber (transparent pipe 16 in the illustrated embodiment) is comprised of fused quartz or other transparent material able to withstand internal fluid 18 pressure, and may be supported by the cover (structural jacket 14 in the illustrated embodiment) as the fluid 18 travels through the system.

Figure 3:
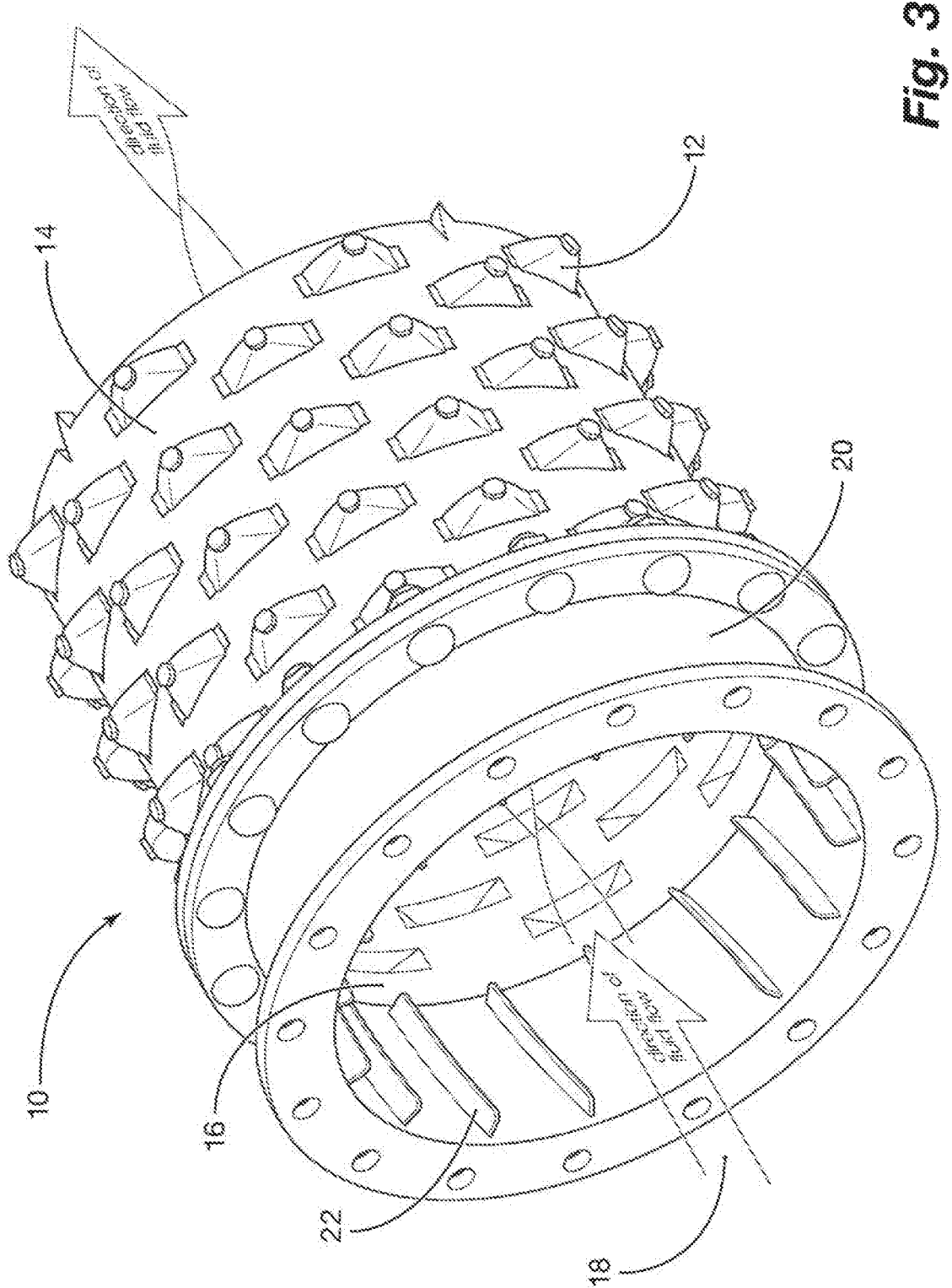
FIG. 3 is a schematic perspective view of a section of a single flow treatment cell assembly incorporating fluid turning vanes upstream of the treatment flow cell.

The apparatus may comprise one or more elements for inducing rotational or vortical fluid motion in the fluid to be treated. The elements may, for example, be in the form of vanes 22 (FIG. 3). The vanes may be arranged in or upstream of the fluid chamber.

FIG. 3 shows a treatment flow cell apparatus 10 for sterilizing fluids 18 using UV light produced by an array of ultraviolet light units (also referred to herein as LED reflector subassemblies 12 or subassemblies 12) having a flanged mini spool piece 20 with a set of fluid turning vanes 22 upstream of the treatment flow cell. The turning vanes induce a rotational or vortical fluid 18 motion through the flow cell 10. It is understood that in yet another embodiment, any configuration that induces a rotation or vortical fluid motion of the fluid 18 through the flow cell 10 may be used. For example, a stationary cylindrical or other shaped body, or oscillating or spinning shaped body may be placed in the intake or other suitable area of the fluid inlet 18 such that the fluid is flowing past any one or more of these bodies and attains a motion such that all of the fluid is adequately treated to achieve sterilization and inactivation of biological pathogens or other desired treatment.

In a preferred embodiment, each reflector subassembly 12 comprises interior reflector surfaces 17a that are generally aligned perpendicular to a central axis 19 of the fluid chamber, and interior reflector surfaces 17b that are generally aligned parallel to the central axis 19, as shown in FIG. 2a. The interior reflector surfaces 17a that are generally aligned perpendicular to the central axis 19 are defined/formed by a set of parabolas that share a common focal point. The interior reflector surfaces 17b that are generally aligned parallel to the central axis 19 are defined/formed by a set of ellipses that share the same common focal point as the parabolic surfaces. The UV LED emitting surface is positioned at the common focal point.

Figure 2B:
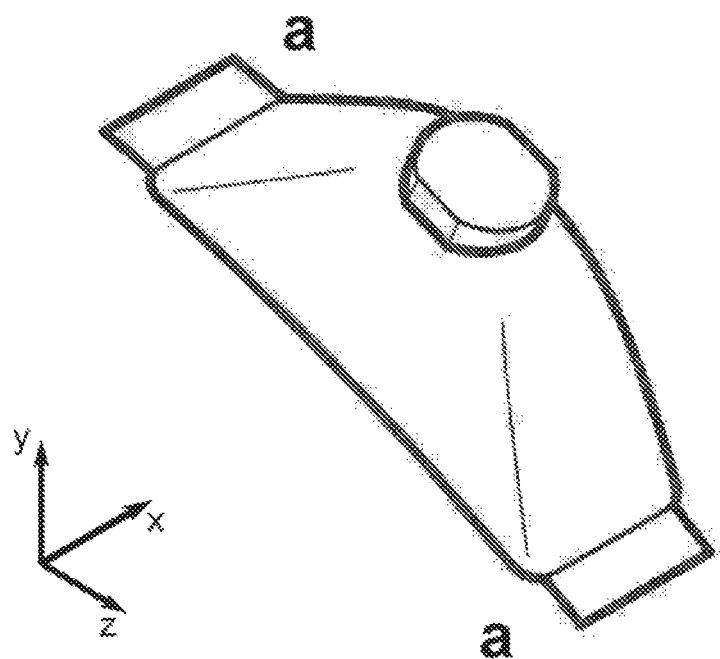

Any curve which is formed by the intersection of the interior reflector surfaces 17a that are generally aligned perpendicular to a central axis 19 of the fluid chamber, and any imaginary vertical plane diagonally bisecting the reflector base and which includes the common focal point of the reflector (e.g. along line a-a as shown in FIG. 2b) will be a parabola. Any curve which is formed by the intersection of the reflector surfaces 17b and any imaginary vertical plane diagonally bisecting the reflector base and which includes the common focal point of the reflector will be an ellipse. Therefore, the light is collimated such that the rays are parallel in a first direction perpendicular to the central axis 19 and converged in a second direction perpendicular to the first direction (i.e. converging in a plane parallel to plane y-z in FIG. 2a) to focus on the central axis or other desired point or axis.

In an alternative embodiment, the interior reflector surfaces 17a that are generally aligned perpendicular to the central axis 19 are formed by a set of parabolas that share a common focal point. The interior reflector surfaces 17b that are generally aligned parallel to the longitudinal axis of the pipe are planar. Therefore, the light is collimated such that the rays are parallel in the first direction (perpendicular to the central axis 19) and scattered in the second direction perpendicular to the first direction, such that the rays are scattered in a plane parallel to plane yz of FIG. 2a, to focus at or near the central axis or another desired point or axis.

In the illustrated embodiments, the shape of the reflector 26 is such that the light is collimated in the direction of the pipe's longitudinal x axis 19, such that the rays of light are parallel across the diameter or cross section of fluid flow in a first direction perpendicular to the longitudinal x axis 19. In one embodiment, the interior surface of the reflector 26 has a parabolic shape in the direction of the view shown in FIG. 4.

Figure 8:
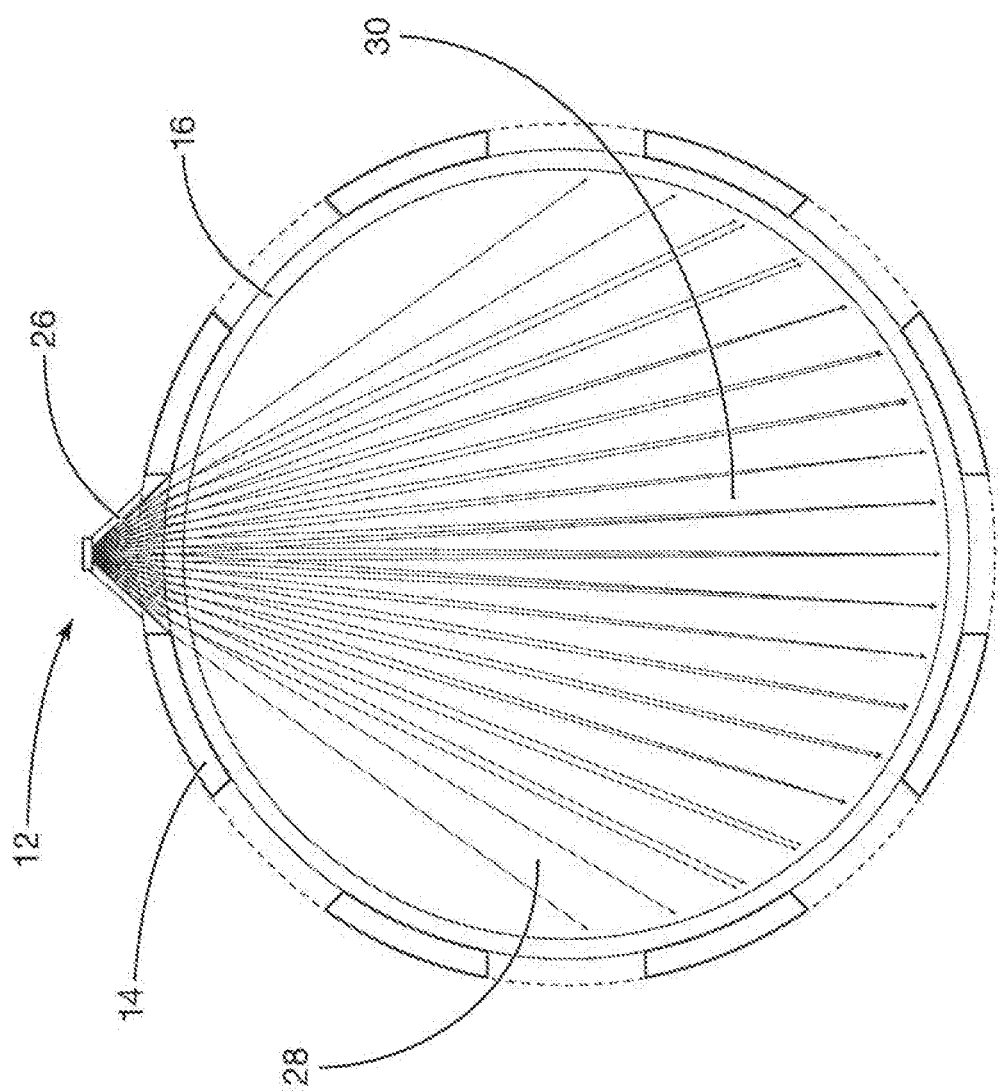
FIG. 8 is a schematic section view of the treatment cell including scattered UV light ray pattern (in the yz plane) from one reflector subassembly according to that shown in FIG. 5.

Alternatively, the shape of the reflector may be configured to collimate the light in the first direction as above and also to scatter the light in the second direction, the second direction being perpendicular to the first direction, so as to form a fan shape radiating away from the reflector in a plane parallel to plane yz of FIG. 2a, as shown in FIG. 8. The reflector may collimate the reflected light such that the rays are parallel in a direction perpendicular to the pipe's longitudinal axis, and scatter reflected rays through the cross section of the pipe 16, thereby forming a fan shape.

Figure 4:
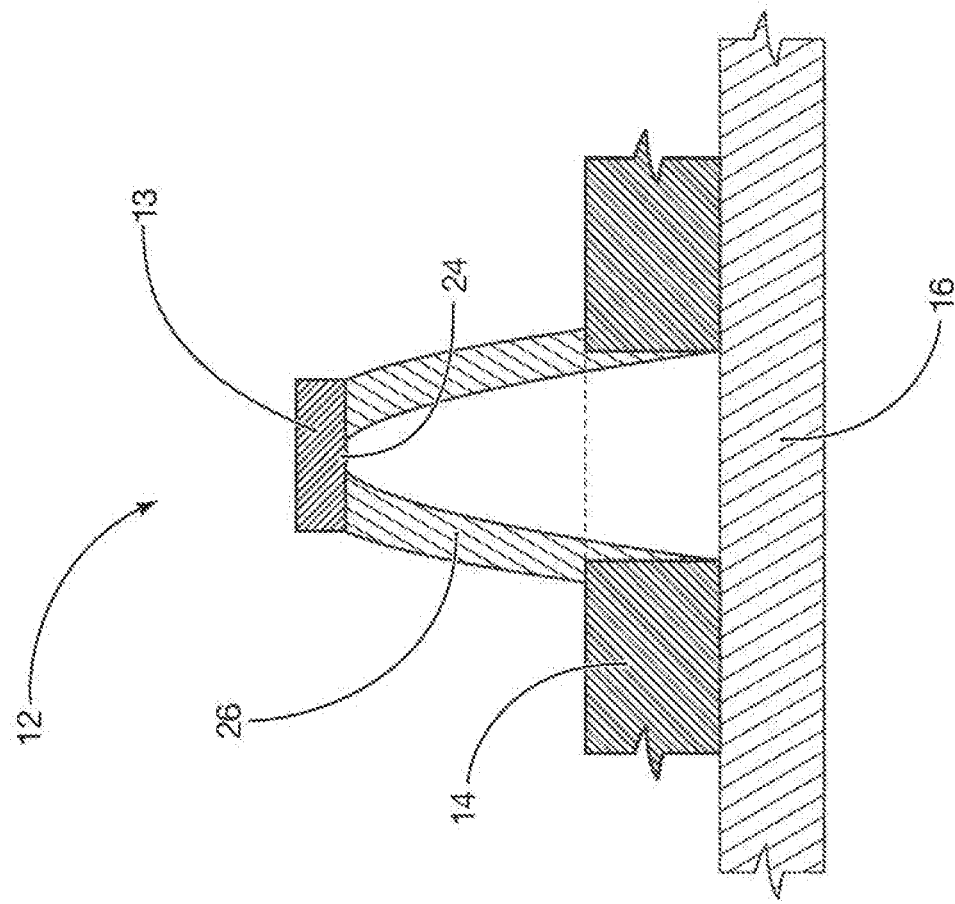
FIG. 4 is a schematic enlarged side elevation section view of one reflector subassembly as viewed in a plane (xy or xz) aligned with the central axis x of the fluid chamber.
Figure 9:
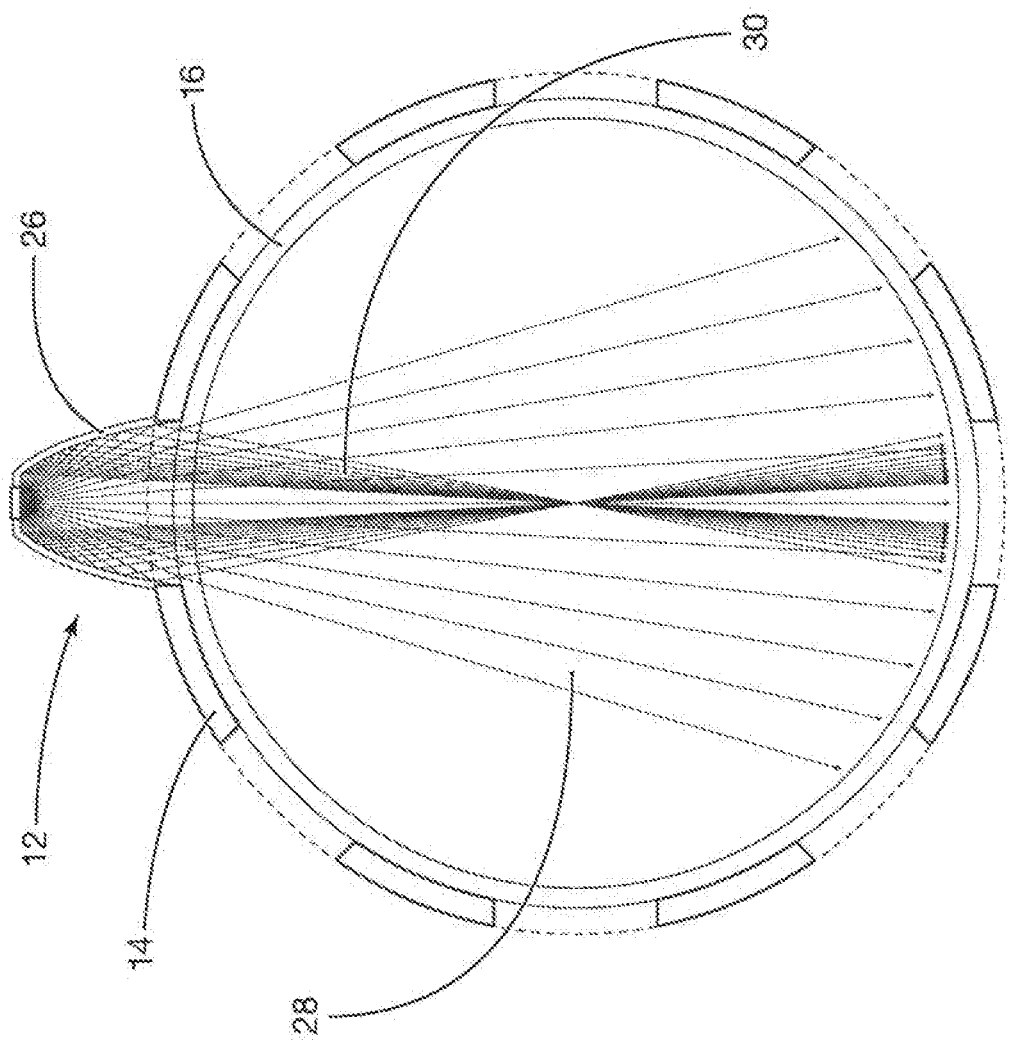
FIG. 9 is a schematic section view of the treatment cell illustrating the convergent ray pattern (in the yz plane) from a reflector subassembly according to that shown in FIG. 6.

Alternatively, the reflector collimates the reflected light as above in the direction of the pipe's longitudinal axis 19, such that the rays of light are parallel in a first direction perpendicular to the longitudinal axis 19 and concentrates reflected rays through the cross section of the pipe 16, in a plane parallel to plane y-z of FIG. 2a, as shown in FIG. 9, thereby forming a wedge shape. FIG. 4 depicts the pipe side view of an LED package 13 with a semiconductor die chip 24 mounted on a reflector 26 such that the LED chip 24 is located at the focal point of the reflector. The LED reflector 26 may be comprised of plastic with the interior surface coating having an aluminum coating facing the inside of the structural jacket 14. Each reflector subassembly 12 is mounted into a structural jacket 14 and flush with the outer surface of a transparent pipe 16. The illustrated embodiment shows a reflector 26 with a width approximately 0.05 times the diameter of the pipe 16.

In another embodiment, the cover (structural jacket 14 in the illustrated embodiment) is adjacent to, and either partially touching, or entirely free of the outer surface of a transparent pipe 16. The number of diodes 24 per LED package 13 may exceed one.

Figure 5:
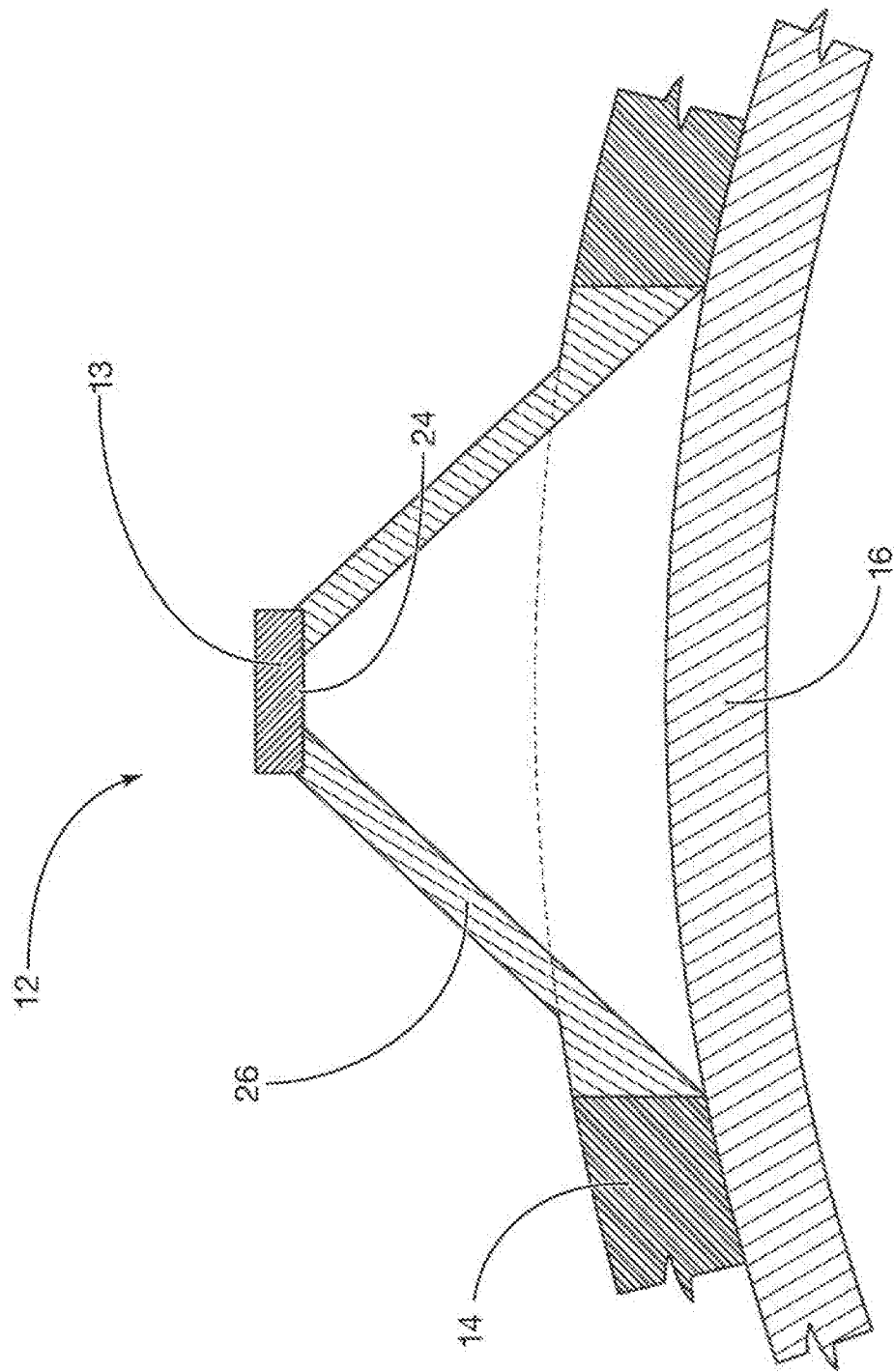
FIG. 5 is a schematic enlarged section view of the reflector subassembly as shown in FIG. 4 as viewed in a plane (yz) perpendicular to that of FIG. 4.
Figure 6:
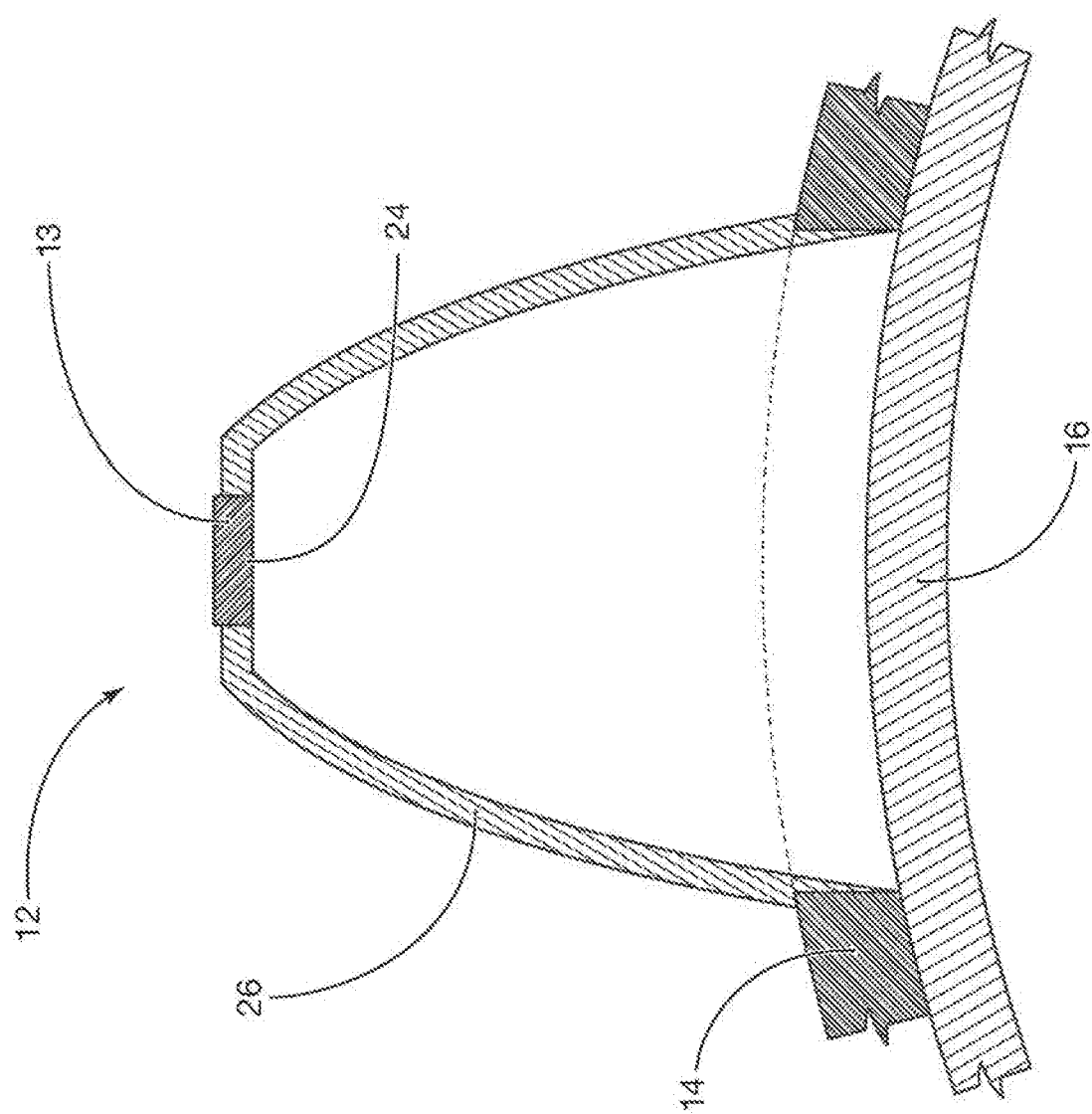
FIG. 6 is a further schematic enlarged section view of an alternative reflector subassembly as shown in FIG. 4 as viewed in a plane (yz) perpendicular to that shown in FIG. 4.

FIGS. 5 and 6 each depict a different LED 13 and reflector 26 subassembly 12 in section view. Each of these subassemblies has a cross section perpendicular to that shown in FIGS. 5 and 6 which is as shown in FIG. 4.

FIG. 5 depicts the LED 13 and reflector 26 subassembly 12 in section view. The illustrated embodiment shows a reflector 26 with a base length approximately 0.2 times the diameter of the pipe 16. The ratio of reflector 26 length to pipe 16 diameter is a function of the required number of LED subassemblies 12 per ring. An embodiment requiring a larger number of subassemblies 12 per ring would exhibit a smaller reflector 26 width to pipe 16 diameter ratio. In one embodiment, having this ratio and interior surface of the reflector 26 in the view shown, the light creates a scattered UV light pattern. The reflector subassembly 12 is shown with an LED package 13 mounted on a reflector 26 such that the chip 24 is located at the focal point of the reflector. The number of diodes 24 per LED package 13 may exceed one. Each reflector subassembly 12 is mounted into a structural jacket 14, which surrounds the outer surface of a transparent pipe 16.

FIG. 6 depicts yet another reflector subassembly 12 in section view. The interior surface of reflector 26 in the view shown is elliptical and focuses light on a location distant from the reflector. The reflector subassembly 12 is shown with a LED package 13 mounted on a reflector 26 such that the chip 24 is located at the focal point of the reflector. Each reflector subassembly 12 is mounted into a structural jacket 14, which surrounds the outer surface of a transparent pipe 16. The number of diodes 24 per LED package 13 may exceed one.

Figure 7:
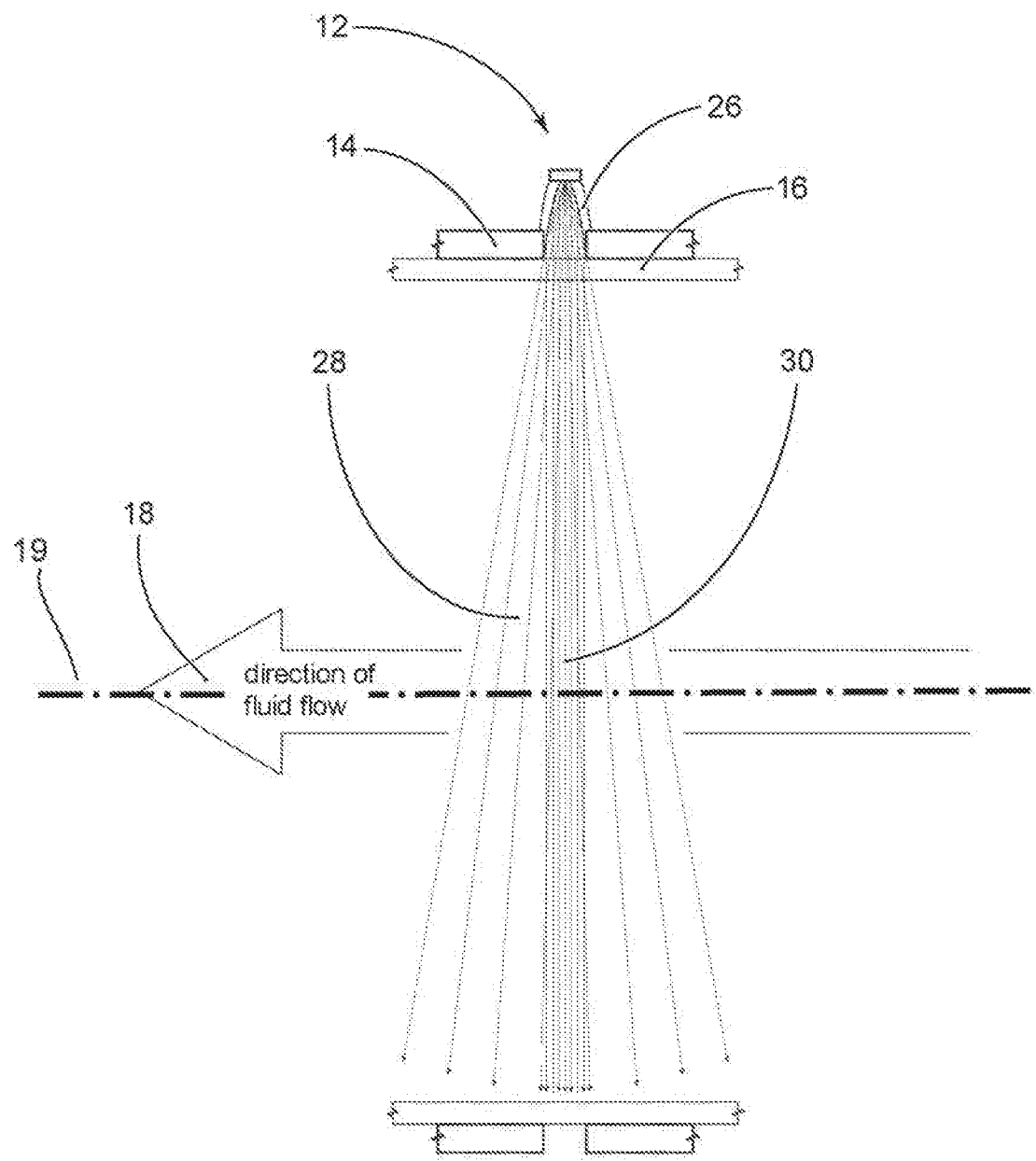
FIG. 7 is a schematic pipe side elevation section view including collimated UV light ray pattern from one LED reflector subassembly of FIG. 4.

FIG. 7 depicts directly emitted UV rays 28 and collimated UV rays 30 from one LED reflector subassembly 12. The shape of the reflector 26 is designed to collimate the reflected light from the LED such that the rays are parallel in a direction perpendicular to fluid flow 18. In one embodiment the ratio of collimated rays 30 to directly emitted rays 28 exceeds 10:1. Preferably, collimated rays pass through the fluid perpendicular to the direction of fluid flow. The side cross-section of the structural jacket 14 and the transparent pipe 16 are shown.

FIG. 8 depicts a single LED reflector subassembly 12 in section view and directly emitted UV rays 28 and collimated UV rays 30 scattered through the cross sectional area of the pipe 16 similar to the LED reflector subassembly 12 in FIG. 5. FIG. 8 is a section view of the subassembly 12 illustrated in FIG. 7. The intensity of light from the LED reflector assembly 12 in the cross section is designed to be substantially evenly distributed. It is understood that the structural jacket 14 will have one or more LED reflector subassembly 12; for purposes of illustration only one is shown here.

FIG. 9 depicts a single LED reflector subassembly 12 in section view and directly emitted UV rays 28 and reflected UV rays 30 concentrated through the cross sectional area of the pipe 16 similar to the LED reflector subassembly 12 in FIG. 6. FIG. 9 is a section view of the subassembly 12 illustrated in FIG. 7. The interior surface shape of the reflector 26 in this view is designed to focus the light reflected off the interior surface of the reflector 26 from the LED to a location distant from the reflector. In one embodiment the focal point of the reflector 26 is approximately the center of the pipe 16. It is understood that the structural jacket 14 will have one or more LED reflector subassembly 12; for purposes of illustration only one is shown here.

Figure 10:
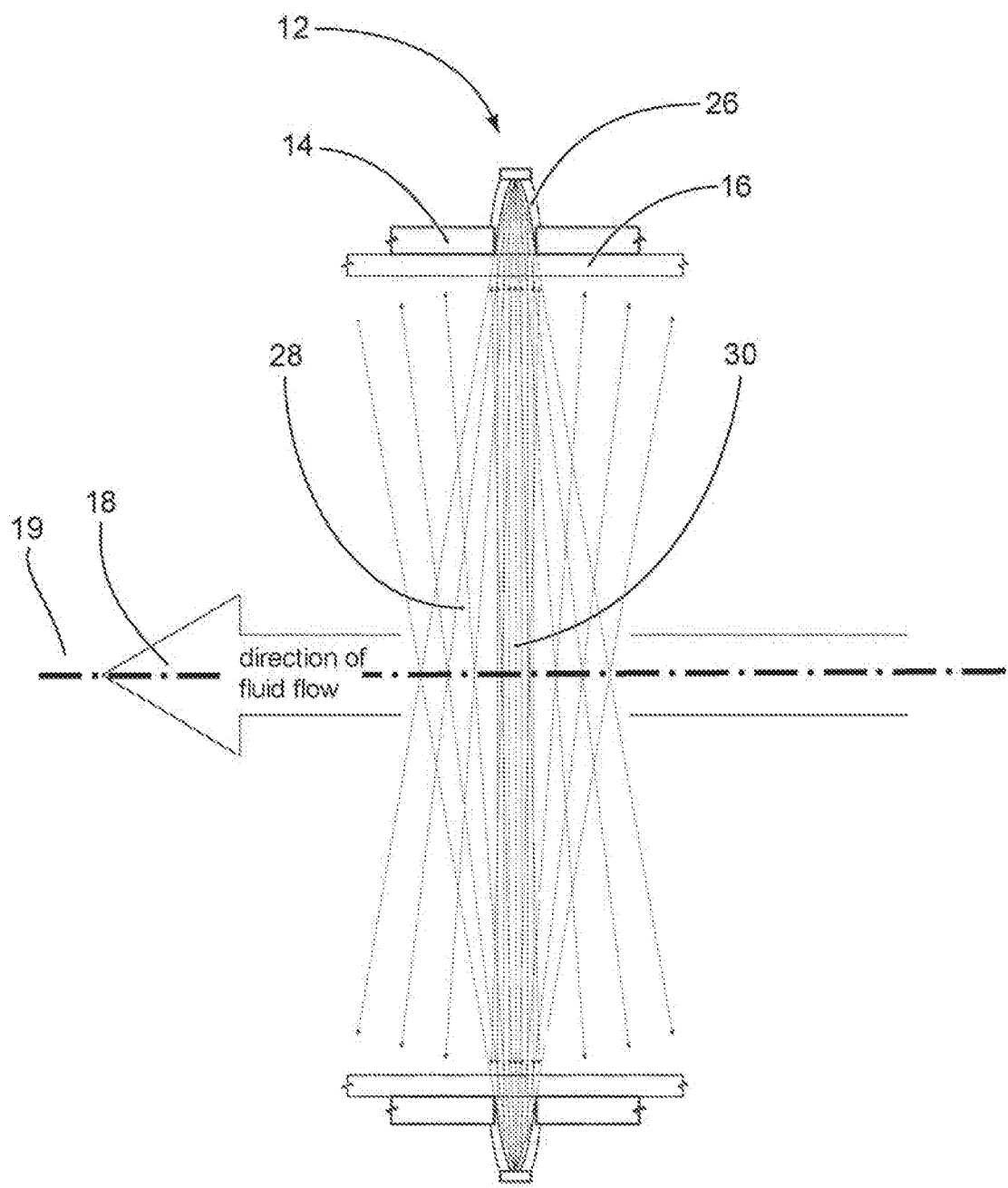
FIG. 10 is a schematic side view of the treatment cell illustrating the collimated UV light ray pattern extending in the x axis from two reflector subassemblies of FIGS. 4 and 7 arranged at diametrically opposed sides of the treatment cell.

FIG. 10 illustrates the distribution of directly emitted 28 and reflected 30 UV light through the pipe 16 perpendicular to the fluid flow 18. The LED reflector subassemblies 12 shown depict a parabolic shape similar to the subassembly 12 in FIG. 4 and FIG. 7. In the illustrated embodiment there is one ring of LED reflector sub-assemblies 12 in the structural jacket 14. There is no upper limit to the number of rings that can be included in the treatment flow cell 10. In yet another embodiment, shown in FIG. 3, the fluid 18 is flowing in a rotational or vortical manner.

Preferably, the apparatus comprises a plurality of ultraviolet light units distributed around the periphery of the fluid chamber. Most preferably, the ultraviolet light units may be arranged in rings around a circumference of the fluid chamber. (The terms 'rings' and 'circumference' are to be interpreted to include their equivalents for fluid chambers having non-circular cross sections, the 'circumference' being a periphery or perimeter of the fluid chamber.) The ultraviolet light units may be evenly distributed around the circumference. The apparatus may comprise a plurality of rings of UV light units.

Figure 11:
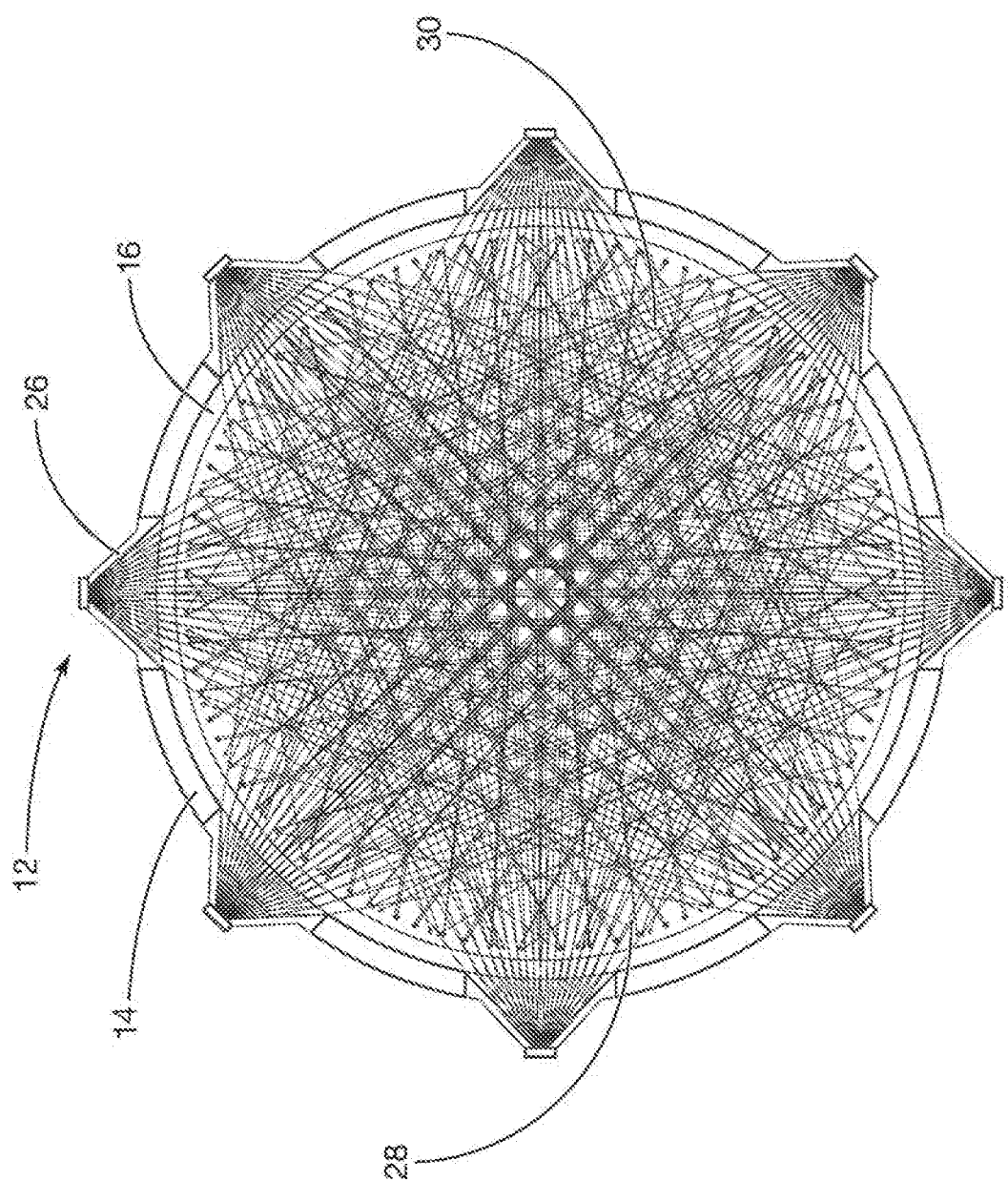
FIG. 11 is a schematic section view of the treatment cell illustrating the scattered UV light ray pattern (in the yz plane) from eight reflector subassemblies according to that shown in FIG. 5.

FIG. 11 illustrates the distribution of directly emitted 28 and scattered reflected 30 UV light through the cross section of the pipe 16. The array of LED reflector subassemblies 12 in the structural jacket 14 around the pipe 16 is designed to evenly distribute intensity of UV through the cross-section of the pipe 16. The LED reflector subassemblies 12 take on the size and shape similar to the subassembly 12 shown in FIG. 5. In the illustrated embodiment, there are eight LED reflector sub-assemblies 12. The number of LED reflector sub-assemblies per ring may range from one up to as many as can fit around the circumference of the pipe 16.

Figure 12:
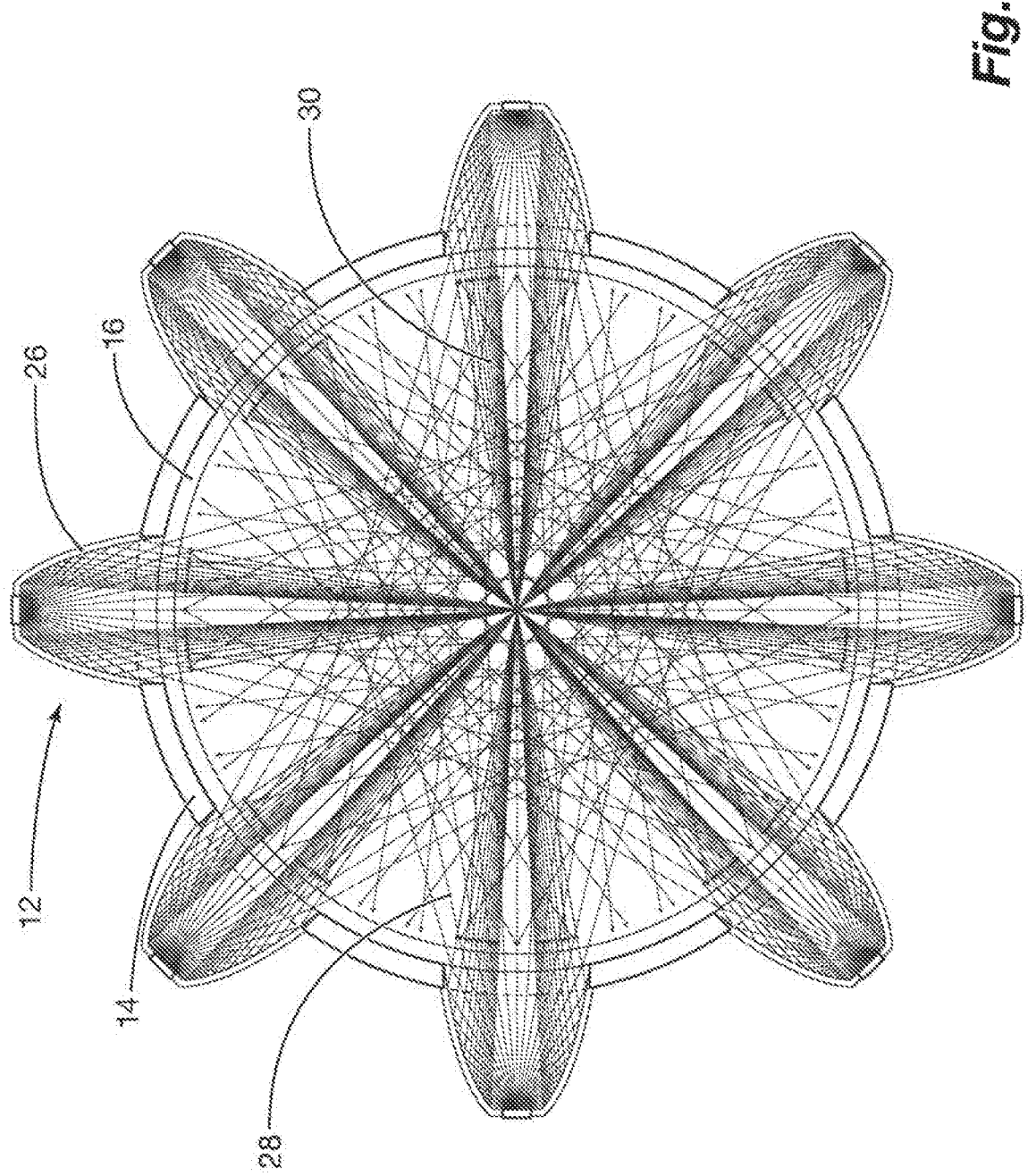
FIG. 12 is a schematic section view of the treatment cell illustrating the convergent UV light ray pattern (in the yz plane) from eight reflector subassemblies according to that shown in FIG. 6.

In embodiments where the light is converged, the focal points of each of the UV units may be coincident as shown in FIG. 12.

FIG. 12 illustrates the distribution of directly emitted 28 and concentrated reflected 30 UV light through the cross section of the pipe 16. The array of LED reflector subassemblies 12 are ellipsoidal in shape and are staggered in rows in the longitudinal axis of structural jacket 14 around the pipe 16, all of which is designed to evenly distribute intensity of UV through the cross-section of the pipe 16. In the illustrated embodiment, there are eight LED reflector sub-assemblies 12. The number of LED reflector sub-assemblies 12 per ring may range from one up to as many as can fit around the circumference of the pipe 16.

Combinations of different reflector geometries or optically useful geometries not shown may be used within rings or as rows of rings incorporating different reflector types.

Figure 13:
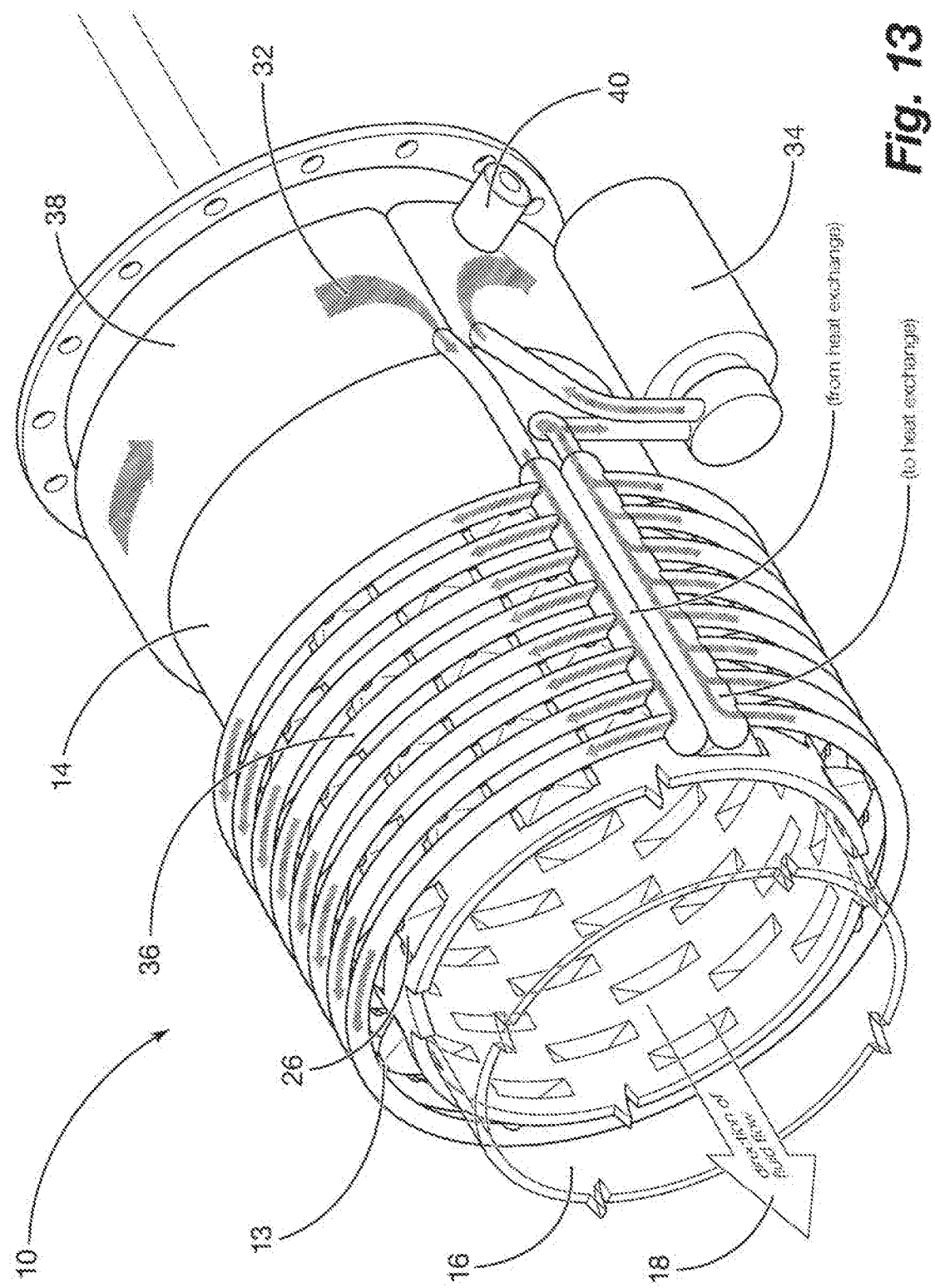
FIG. 13 is a schematic perspective view of section of a treatment flow cell incorporating an indirect liquid LED cooling and heat exchange subsystem.

In a further embodiment, the LEDs may be cooled by use of a circulating indirect liquid cooling system which uses the fluid being treated as a heat sink for the energy being produced by the LEDs. In a preferred embodiment, cooling for the array of LEDs may be achieved through any indirect cooling system such as glycol mixture-filled copper tubes touching the case of each LED and a pump to keep the liquid moving. In the case of water treatment, the water passes through a heat exchange section and cools the glycol mixture, and the cooled glycol mixture cools the LEDs, resulting in a heat exchange with the water to be treated. FIG. 13 illustrates the location and configuration of the indirect liquid LED cooling system. A liquid coolant 32 is pumped by the coolant pump 34 through coolant tubing 36. It is to be understood that the coolant flow direction may be reversed from time to time during operation. The coolant tubing 36 comes into contact with the heat sink casing of each LED package 13 in the treatment flow cell 10. At the point of contact between the coolant tubing 36 and the LED package 13 a material with a high coefficient of heat transfer is used. Heat generated by each LED package 13 is transferred to the liquid coolant 32 as it circulates through the coolant tubing 36. In one embodiment each ring of LEDs is contacted by a single ring of coolant tubing. There may be additional embodiments where coolant tubing 36 comes into contact with some or all of the LEDs 13 in each ring.

After coming into contact with one or more LEDs 13, coolant 32 is conveyed to a heat exchange section 38. The heat exchange section 38 is in indirect thermal contact with enough of the fluid being treated 18 to transfer the heat from the LEDs 13 to the fluid being treated 18. The heat exchange section 38 may be arranged upstream of the LEDs to reduce scaling.

Monitoring and controlling the temperature of the LED cooling liquid may be achieved because the LED UV light output is a linear function of the LED operating temperature. For example, cold cooling liquid will result in brighter light and warmer cooling liquid will result in dimmer light. One or more temperature sensors mounted into the circulating cooling liquid with a software program implemented into the inventive system can turn on additional LEDs or rings of LEDs when the cooling liquid is warmer.

In a preferred embodiment, the one or more temperature sensors 40 measure the coolant 32 temperature flowing through the heat exchange section 38. When fluid being treated 18 has a relatively high temperature its cooling efficiency will decrease. This will be measured indirectly by the coolant liquid 32 temperature sensors 40. Treatment system monitoring software may include instructions to turn on additional LEDs 13 or rings of LEDs when treatment fluid 18 temperature is relatively high, and to turn off LEDs 13 or rings of LEDs when treatment fluid 18 temperature is relatively low.

Also, the inventive system is designed to operate efficiently and adjust to the transmissivity of fluids flowing through the treatment cell. For example, UV transmittance sensors across the flow cell from LEDs can be added to the inventive system to relay information to a software system to turn off LEDs or rings of LEDs in high transmissivity fluids and turn them back on if the transmissivity decreases.

For a system operating at constant, invariable UV output, it is necessary to provide a UV output at all times which will effectively treat the fluid at the highest possible temperature and lowest possible transmissivity in order to ensure that all of the fluid is effectively treated even in this worst case. However, because the energy usage of the system of the present invention can be limited by varying the UV output based on the temperature or transmissivity, the system can be operated at lower outputs when the temperature is lower than the maximum and/or transmissivity is higher than the minimum, thereby increasing operational efficiency.

It is to be understood that the present invention may be used in combination with oxidizing chemicals, such as chlorine, ozone or hydrogen peroxide, injected into the fluid to carry out chemical and/or biological treatment.

Whilst preferred embodiments of the present invention have been described above and illustrated in the drawings, these are by way of example only and non-limiting. It will be appreciated by those skilled in the art that many alternatives are possible within the ambit and scope of the invention. For example, the light directing element may be a lens or other optical means performing the same function as the described reflector.

In an alternate embodiment, the fluid chamber may be formed from an opaque material. In this embodiment, the LEDs may be arranged around the periphery of the inside of the fluid chamber.

In an alternate embodiment, the light directing elements may be configured such that the direction of scattering or convergence of light is not perpendicular to the axis of the fluid chamber.

The system of the present invention may comprise a plurality of apparatuses arranged in series or in parallel and configured such that flow may be diverted away from any one apparatus and through one or more alternate apparatuses to allow for cleaning of the inside of the first apparatus without shutting down the system.

The apparatus may comprise a plurality of arrays of LEDs, each array of LEDs being isolatable from the other arrays of LEDs such that maintenance of any one array of LEDs may be carried out without shutting down all LEDs in the apparatus. In this way, the apparatus may continue to function during maintenance.

The system, apparatus and method of the present invention are particularly suitable for drinking water treatment, wastewater treatment, treatment of industrial process water and other applications requiring high fluid flow rates of fluid to be treated. In a preferred embodiment, each apparatus may be configured to treat 15 to 750 cubic meters of water per hour. Preferably, each apparatus may be configured to treat 30 to 500 cubic meters of water per hour. Most preferably, each apparatus may be configured to treat approximately 250 cubic meters of water per hour.

Preferably, the fluid flow speed through the apparatus may be approximately 1 m/s.

It will be appreciated from the foregoing that the apparatus is not limited to the described treatment flow cell 10. For example, the fluid chamber may be a container for at least temporarily retaining a body of fluid for treatment, rather than a conduit (e.g. pipe 16). In this embodiment, it is not necessary for the fluid to flow directly through the apparatus. The fluid may instead be retained in the container for a period of time for treatment. The apparatus may be provided with means for circulating or agitating the fluid within the fluid chamber such that the fluid moves past through the UV light for treatment, for example a pump.

Each feature disclosed in this specification (including the accompanying claims and drawings), may be replaced by alternative features serving the same, equivalent or similar purpose, unless expressly stated otherwise, as set forth in the appended claims Thus, unless expressly stated otherwise, each feature disclosed is one example only of a generic series of equivalent or similar features, as set forth in the appended claims. In addition, all of the features disclosed in this specification (including the accompanying claims and drawings), and/or all of the steps of any method or process so disclosed, may be combined in any combination, except combinations where at least some of such features and/or steps are mutually exclusive, as set forth in the appended claims. Accordingly, while many different embodiments of the present invention have been described above, any one or more or all of the features described, illustrated and/or claimed in the appended claims may be used in isolation or in various combinations in any embodiment, as set forth in the appended claims. As such, any one or more feature may be removed, substituted and/or added to any of the feature combinations described, illustrated and/or claimed, as set forth in the appended claims. For the avoidance of doubt, any one or more of the features of any embodiment may be combined and/or used separately in a different embodiment with any other feature or features from any of the embodiments, as set forth in the appended claims.

The invention claimed is:

1. An apparatus for the treatment of a fluid comprising;
    a fluid chamber having a longitudinal axis;
    at least one ultraviolet light source configured to emit light within at least one reflector;
    the least one reflector having interior reflector surfaces aligned perpendicular to the longitudinal axis and interior reflector surfaces aligned parallel to the longitudinal axis;
    wherein the interior reflector surfaces aligned perpendicular to the longitudinal axis are defined by a set of parabolas having a common focal point and at least a portion of the emitted light is collimated such that the light is parallel in a first direction, perpendicular to the longitudinal axis, and
    wherein the interior reflector surfaces aligned parallel to the longitudinal axis are defined by a set of ellipses having a common focal point and at least a portion of the emitted light is converged in a second direction perpendicular to the first direction.

2. The apparatus for the treatment of a fluid of claim 1, wherein the interior reflector surfaces aligned parallel to the longitudinal axis are planar and at least a portion of the emitted light is scattered.

3. The apparatus for the treatment of a fluid of claim 1, wherein the at least one ultraviolet light source is positioned at the common focal point of the set of parabolas defining the interior reflector surfaces aligned perpendicular to the longitudinal axis of the at least one reflector.

4. The apparatus for the treatment of a fluid of claim 1, wherein the interior reflector surfaces aligned parallel to the longitudinal axis and defined by a set of ellipses of the at least one reflector, are configured to converge and focus at least a portion of the emitted light at the longitudinal axis.

5. The apparatus for the treatment of a fluid of claim 1, wherein the fluid chamber is free of obstructions to fluid flow.

6. The apparatus for the treatment of a fluid of claim 1, further comprising at least one element for inducing rotational motion in the fluid to be treated, located upstream of fluid chamber.

7. The apparatus for the treatment of a fluid of claim 1, wherein the fluid chamber is transparent.

8. The apparatus for the treatment of a fluid of claim 1, further comprising a cooling apparatus for controlling the temperature of the at least one ultraviolet light source.

9. The apparatus for the treatment of a fluid of claim 8, wherein the cooling apparatus is configured to controllably transfer heat from the at least one ultraviolet light source to the fluid being treated.

10. The apparatus for the treatment of a fluid of claim 8, wherein the cooling apparatus comprises a coolant circuit containing a coolant and wherein:
    a first part of the coolant circuit is arranged in contact with the at least one ultraviolet light source for transfer of heat between the ultraviolet light source and the coolant; and
    a second part of the coolant circuit comprises a heat exchanger for transfer of heat between the coolant and the fluid being treated.

11. The apparatus for the treatment of a fluid of claim 8, further comprising a control element configured to change a light output of the at least one ultraviolet light source in response to a change in the temperature of the coolant.

12. The apparatus for the treatment of a fluid of claim 8, further comprising a control element configured to change a light output of the at least one ultraviolet light source in response to a change in the transmissivity of the fluid to be treated.

13. The apparatus for the treatment of a fluid of claim 8, further comprising a plurality of ultraviolet light sources, wherein the control element is configured to increase or decrease the number of ultraviolet light source emitting light in response to an increase or decrease in the temperature of the coolant.

14. The apparatus for the treatment of a fluid of claim 1, wherein the at least one ultraviolet light source comprises at least one ultraviolet light emitting diode.

15. An apparatus for the treatment of a fluid comprising;
    a fluid chamber having a longitudinal axis;
    at least one ultraviolet light source configured to emit light within at least one reflector;
    the least one reflector having interior reflector surfaces aligned perpendicular to the longitudinal axis and interior reflector surfaces aligned parallel to the longitudinal axis;
    wherein the interior reflector surfaces aligned perpendicular to the longitudinal axis are defined by a set of parabolas having a common focal point and at least a portion of the emitted light is collimated such that the light is parallel in a first direction, perpendicular to the longitudinal axis; and wherein the interior reflector surfaces aligned parallel to the longitudinal axis are defined by a set of ellipses and are configured to converge and focus at least a portion of the emitted light at the longitudinal axis.

16. The apparatus for the treatment of a fluid of claim 15, wherein the interior reflector surfaces aligned parallel to the longitudinal axis and defined by a set of ellipses having a common focal point, converge at least a portion of the emitted light in a second direction perpendicular to the first direction.

17. The apparatus for the treatment of a fluid of claim 15, wherein the interior reflector surfaces aligned parallel to the longitudinal axis are planar and at least a portion of the emitted light is scattered.

18. The apparatus for the treatment of a fluid of claim 15, wherein the at least one ultraviolet light source is positioned at the common focal point of the set of parabolas defining the interior reflector surfaces aligned perpendicular to the longitudinal axis of the at least one reflector.

19. The apparatus for the treatment of a fluid of claim 15, wherein the fluid chamber is free of obstructions to fluid flow.

20. The apparatus for the treatment of a fluid of claim 15, further comprising at least one element for inducing rotational motion in the fluid to be treated, located upstream of fluid chamber.

21. The apparatus for the treatment of a fluid of claim 15, wherein the fluid chamber is transparent.

22. The apparatus for the treatment of a fluid of claim 15, further comprising a cooling apparatus for controlling the temperature of the at least one ultraviolet light source.

23. The apparatus for the treatment of a fluid of claim 22, wherein the cooling apparatus is configured to controllably transfer heat from the at least one ultraviolet light source to the fluid being treated.

24. The apparatus for the treatment of a fluid of claim 22, wherein the cooling apparatus comprises a coolant circuit containing a coolant and wherein:
   a first part of the coolant circuit is arranged in contact with the at least one ultraviolet light source for transfer of heat between the ultraviolet light source and the coolant; and
   a second part of the coolant circuit comprises a heat exchanger for transfer of heat between the coolant and the fluid being treated.

25. The apparatus for the treatment of a fluid of claim 24, further comprising a control element configured to change a light output of the at least one ultraviolet light source in response to a change in the temperature of the coolant.

26. The apparatus for the treatment of a fluid of claim 22, further comprising a control element configured to change a light output of the at least one ultraviolet light source in response to a change in the transmissivity of the fluid to be treated.

27. The apparatus for the treatment of a fluid of claim 24, further comprising a plurality of ultraviolet light sources, wherein the control element is configured to increase or decrease the number of ultraviolet light source emitting light in response to an increase or decrease in the temperature of the coolant.

28. The apparatus for the treatment of a fluid of claim 15, wherein the at least one ultraviolet light source comprises at least one ultraviolet light emitting diode.

* * * * *